(12) United States Patent
McClain

(10) Patent No.: US 7,345,707 B1
(45) Date of Patent: Mar. 18, 2008

(54) ANTI-THEFT DEVICE FOR BIG GAME SURVEILLANCE CAMERA

(76) Inventor: James S. McClain, 112 Chadrick Dr., Madison, AL (US) 35768

( * ) Notice: Subject to any disclaimer, the term of this patent is extended or adjusted under 35 U.S.C. 154(b) by 844 days.

(21) Appl. No.: 10/679,769

(22) Filed: Oct. 6, 2003

(51) Int. Cl.
H04N 5/225 (2006.01)
H04N 7/18 (2006.01)

(52) U.S. Cl. ........................ 348/373; 348/151
(58) Field of Classification Search ........... 348/143, 348/151, 154, 155, 373, 374; D16/202, 208, D16/242; 108/147.17; 248/475.1; D8/381, D8/373, 384
See application file for complete search history.

(56) References Cited

U.S. PATENT DOCUMENTS

| | | | |
|---|---|---|---|
| 704,666 A | 7/1902 | Stephens et al. | |
| 993,614 A | 5/1911 | Mueller et al. | 248/217.4 |
| 2,688,901 A * | 9/1954 | Haugaard | 248/476 |
| 5,128,548 A | 7/1992 | Goodson et al. | 250/341 |
| 5,455,625 A | 10/1995 | Englander | 348/375 |
| 5,626,322 A | 5/1997 | Braun | 248/248.1 |
| 5,946,404 A * | 8/1999 | Bakshi et al. | 382/103 |
| 6,019,524 A | 2/2000 | Arbuckle | 396/427 |
| 6,033,129 A | 3/2000 | Foye | 396/427 |
| 6,390,239 B1 * | 5/2002 | McClain | 182/187 |
| 6,449,431 B1 | 9/2002 | Cuddeback et al. | 396/27 |
| 2003/0062200 A1 | 4/2003 | Lewis et al. | 182/187 |
| 2003/0063903 A1* | 4/2003 | Cuddeback et al. | 396/27 |

* cited by examiner

*Primary Examiner*—Ngoc-Yen Vu
*Assistant Examiner*—Albert H Cutler
(74) *Attorney, Agent, or Firm*—Mark Clodfelter

(57) ABSTRACT

An anti-theft device for protection of wildlife surveillance camera systems mounted on a tree includes an external housing fitting over the camera system and substantially enclosing it on all sides. On the front side the housing has a frame overlapping the camera and preventing its removal, while leaving a central portion open to allow viewing by the camera and instruments. The housing has two brackets, one integral with a top side and another one integral with a bottom side of the housing, both brackets at a right angle with the side. The brackets are both bent upward so that the bottom one is underneath the body of the housing and the top one is outside of the body. The brackets are both connected by a lag bolt which is made essentially inaccessible and out of sight. In position underneath the housing, the bottom lag bolt is protected by the housing. The top lag bolt has its head located outside of the housing, but protection is provided by a hub and plug lock denying access.

7 Claims, 4 Drawing Sheets

ANTI-THEFT DEVICE FOR BIG GAME SURVEILLANCE CAMERA

FIELD OF THE INVENTION

This invention relates to providing security for camera systems deployed in locations frequented by wildlife, particularly in areas where big game prey such as deer are likely to be found.

BACKGROUND OF THE INVENTION

Camera systems for wildlife surveillance generally include a motion detector which detects motion of a prey animal and activates a camera focused on the location of the animal. Various other devices may be provided in these systems for performance of functions such as adjustment of the operating range of the camera and control of delay times and sensitivity. In a typical application the camera system is attached to a tree approximately two feet off the ground and is left in this position for photographing all big wild game movement in the area. A hunter is consequently informed of which big game animals are present in a designated hunting site without spending a lot of time in the woods. These camera systems are very expensive and are readily accessible to a thief using a minimum effort with widely available tools. Prior security devices generally are based on use of chains, cables and padlocks, which are easily circumvented by use of bolt cutters or hacksaws. An anti-theft device that provides more of an impediment to the thief is therefore needed.

SUMMARY OF THE INVENTION

The present invention is directed to an anti-theft device for protection of a wildlife surveillance camera deployed in a big game habitat. The device comprises a strong external housing enclosing the camera from all sides and overlapping the camera in front so that the camera can not be removed without first removing or destroying the housing. Protection is provided by securing the housing to a tree with two lag bolts extending through holes in bent-over brackets in parallel relation to the tree. Both of the lag bolts are substantially hidden from view when installed and are inaccessible to tools such as hacksaws and bolt clippers. A first bracket, adjacent a lower side of the housing, is bent over at a right angle toward the inside of the housing and has a keyhole opening allowing the bracket to be hooked over the head of a lag bolt in place in the tree. This bolt is inaccessible and out of sight under the housing. A second bracket is bent upward at the back end of the housing top, this bracket thus being located outside of the housing. A second lag bolt connects this bracket to the tree, this bolt passing directly through an opening in the bracket. A plug lock and a receptacle in the form of a hub in which the lock is engaged are located in position to conceal and prevent access to the second bolt. Removal of the camera and other components of a surveillance system is made substantially more difficult by this device.

It is therefore an object of this invention to provide improved security for big game surveillance camera systems deployed at hunting sites. Another object is to provide an anti-theft device for camera systems wherein bolts connecting the device to a tree are rendered inaccessible for being disabled or removed.

Other objects and advantages of the invention will be apparent from the following description and the appended claims.

DESCRIPTION OF THE PREFERRED EMBODIMENT

Figure 1:
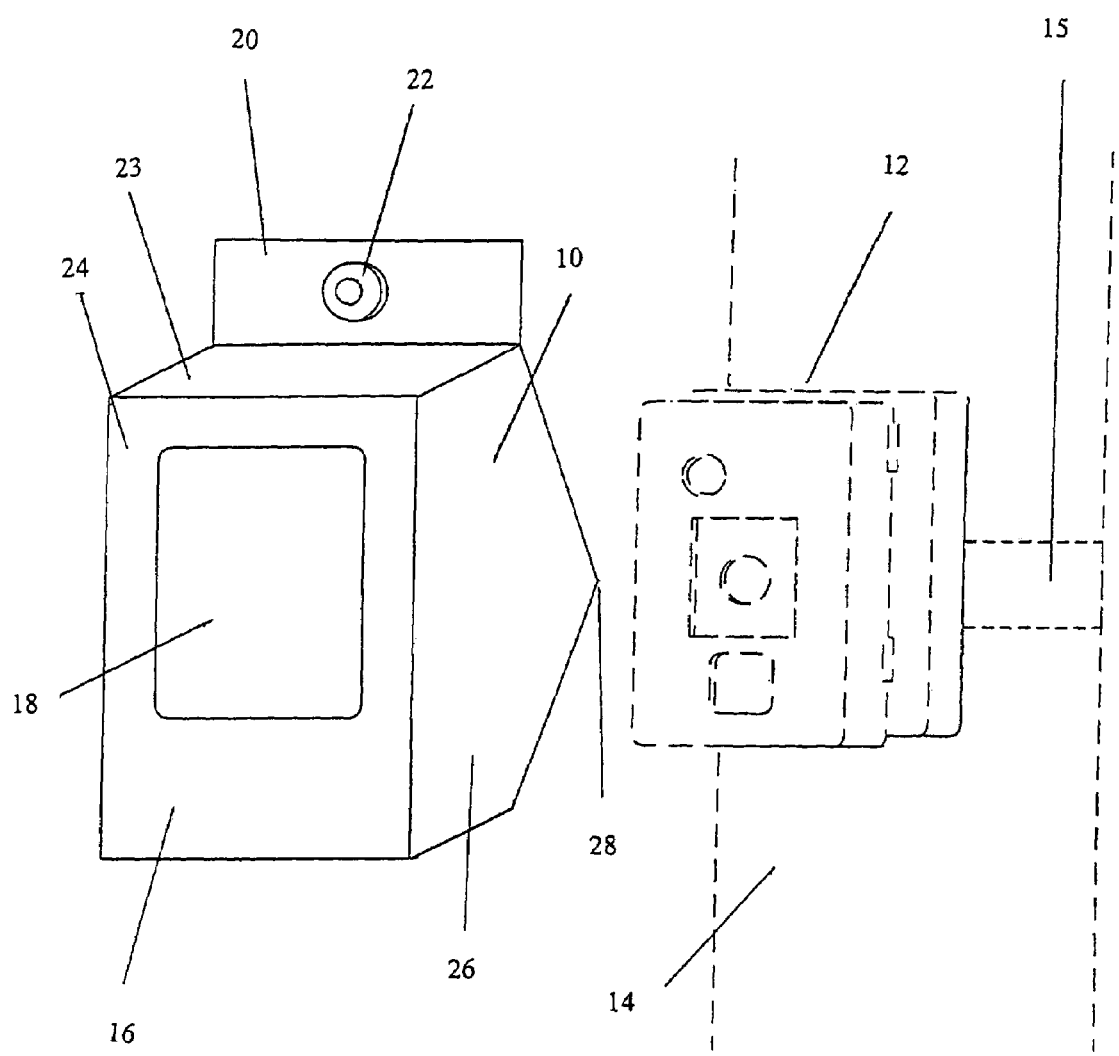
FIG. 1 is a perspective view of an anti-theft device taken from a front corner, with a camera system on a tree shown in dashed lines adjacent to the device.

Referring to FIG. 1 of the drawings, there is shown an anti-theft device 10 alongside a surveillance camera system 12, which is installed on a tree 14 and supported by a strap 15. The device takes the form of a hollow housing generally rectangular in shape having a front side 16 with an open space 18 in front of working parts of the camera and a frame 24 extending around the front, the frame overlapping the camera and preventing it from being removed.

Figure 2:
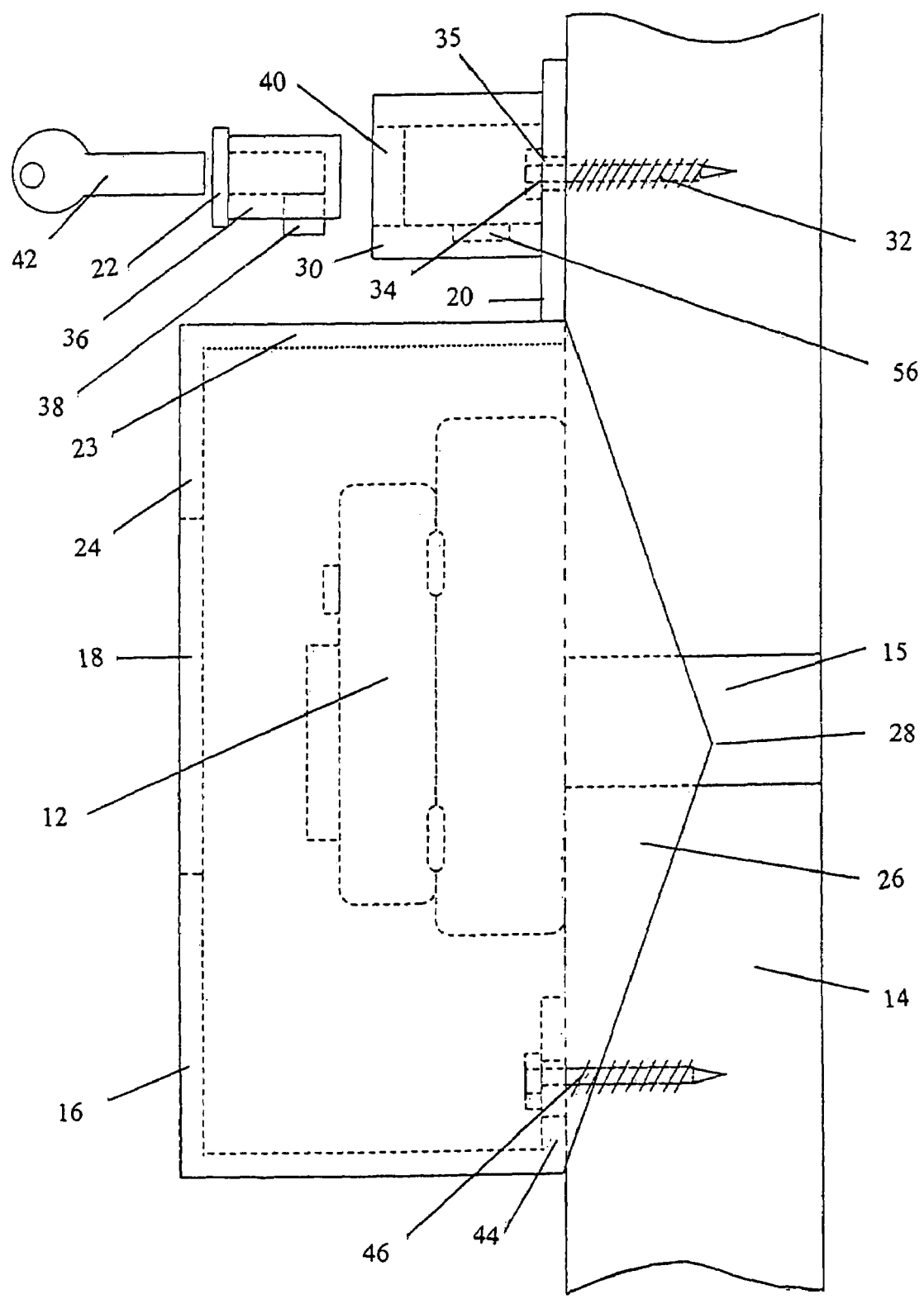
FIG. 2 is a side view, partly in section and partly in dashed lines, showing the device installed over a camera in a tree.

The top 23 has a folded-over extension 20 forming a bracket disposed at a right angle to the top and parallel to the tree. A hole 35 (FIG. 2) extends through the bracket 20 enabling screwing a lag bolt 34 into the tree. This lag bolt is hidden from sight and is made inaccessible by means of a receptacle in the form of a hub 30 rigidly connected to the bracket 20 The hub has an opening 40 at its outer end, into which a plug lock 22 is inserted to deny access to the head of the lag bolt from the outside. A catch 38 mounted on outer wall 36 of the plug engages the hub at a slot 56. Locking and unlocking of the plug lock is carried out by means of a key 42.

Figure 3:
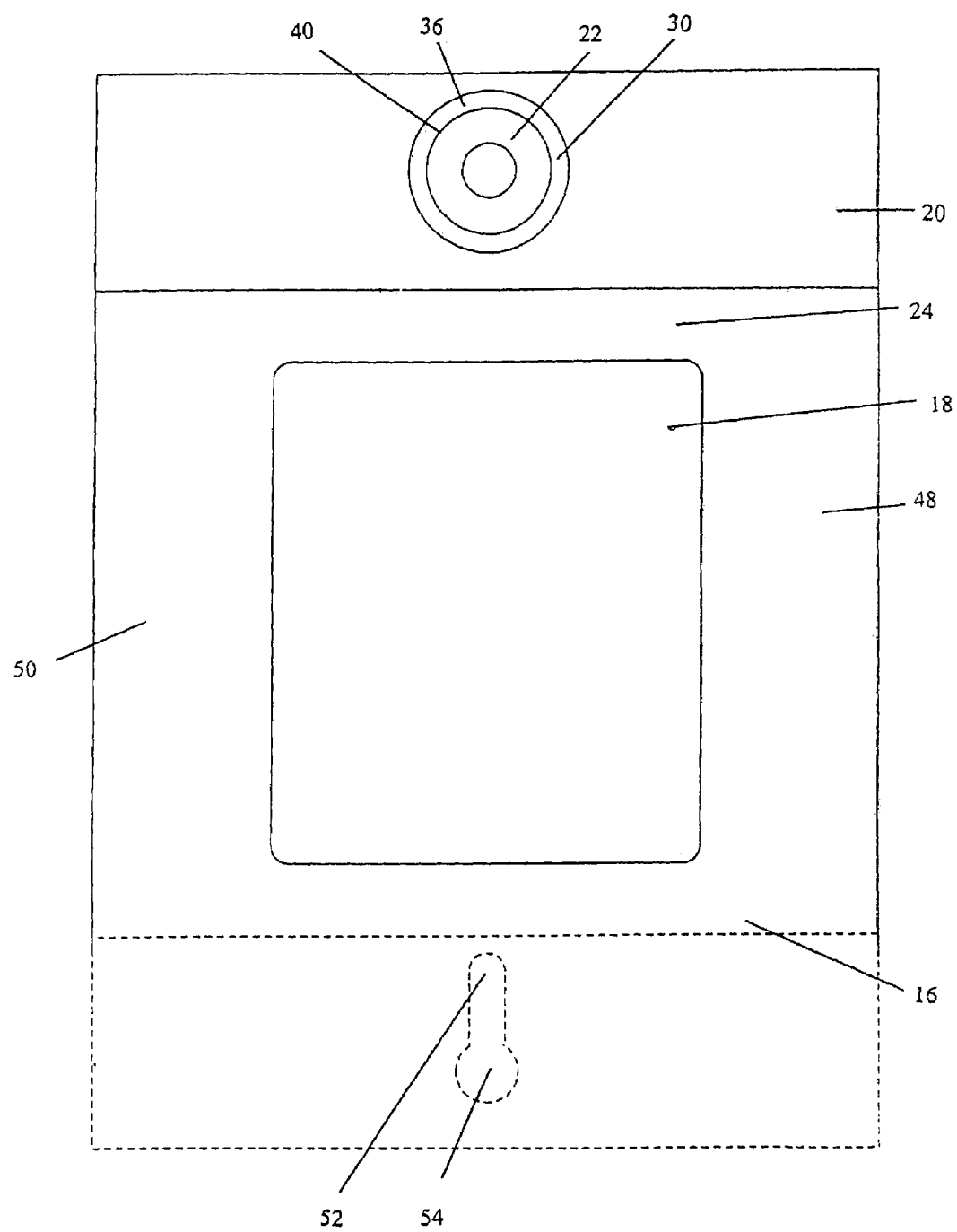
FIG. 3 is a front view of the device, partly in dashed lines.

Bottom 45 (FIG. 2) of the housing has a folded-over extension 44 providing a bracket having an opening 54 (FIG. 3) through which a lag bolt 46 extends, this lag bolt being located inside of the housing and inaccessible for loosening or being removed. As shown in FIG. 3, opening 54 has a wide round portion through which the head 49 of a lag bolt may be passed and an elongated, upwardly extending and narrower channel 52. This allows the lower bracket to be hooked over the bolt head and pulled downward to the end of the channel, placing the upper bracket in proper position for screwing in the upper lag bolt. Placement of the lower bracket in the correct position requires that the lower lag bolt 46 be left only partly tightened so that the bracket will fit loose enough to be moved under the bolt head.

Figure 4:
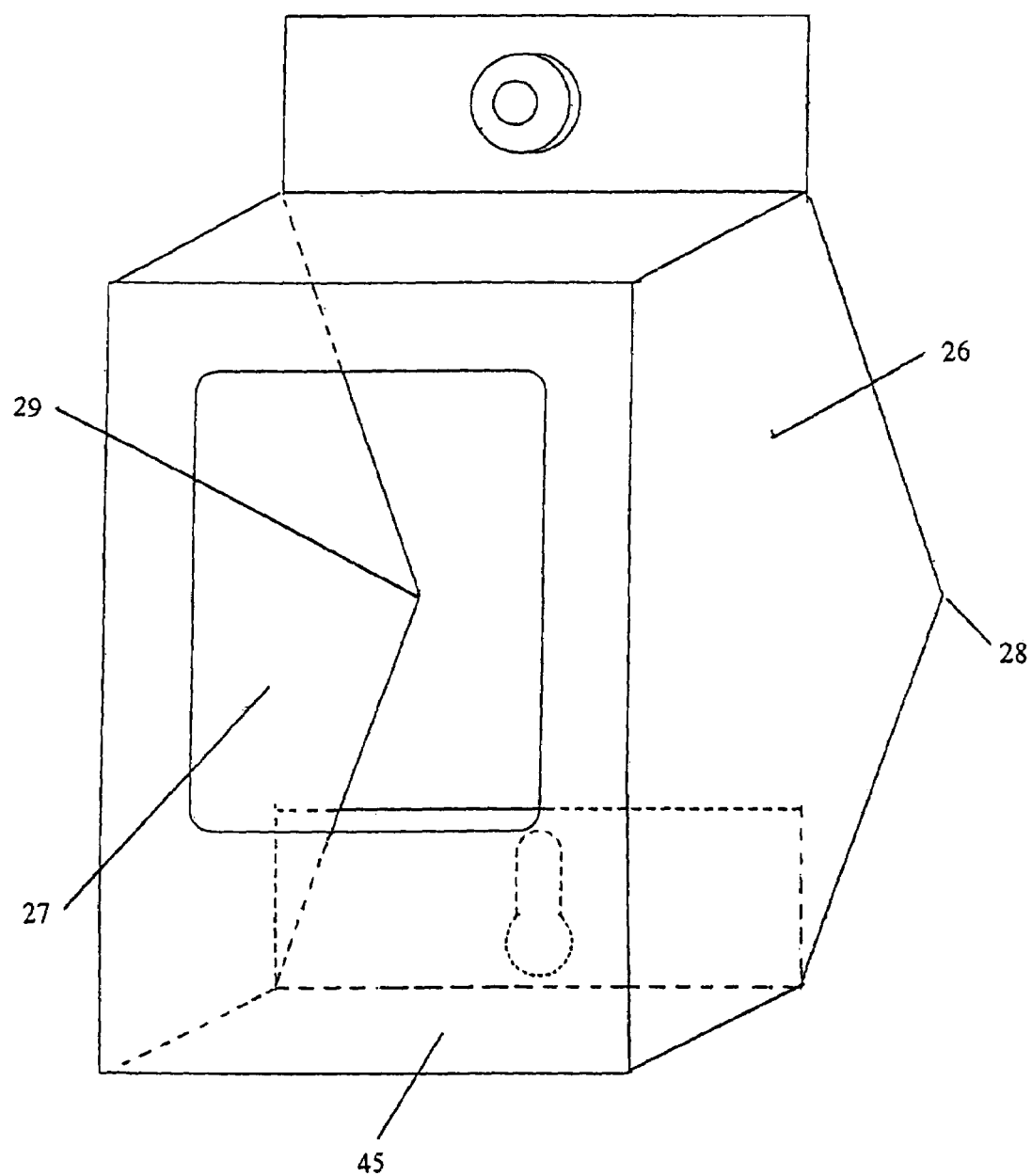
FIG. 4 is a perspective view of a device, taken from a front corner and showing a lower bracket in dashed lines.

As shown in FIG. 4, left and right side housing portions 26 and 27 may each include a triangular extension terminating at a point 28, 29 at a middle location. These portions may provide more shielding against attempts at tampering applied from the side. For larger trees the points would be driven into the tree, and for smaller trees the pointed areas would be forcibly bent and partially wrapped around the tree.

Once the housing is mounted in place over the camera, the presence of the housing prevents access to the camera for purposes of servicing or removal and replacement of film and batteries as required. Thus, removal of the housing by unlocking the plug lock, unscrewing the upper lag bolt and lifting the housing off of the lower lag bolt would be necessary to allow opening of the camera.

While the invention is described above with regard to a specific embodiment, it is not to be understood as limited to details of that embodiment, but is limited only as indicated by the appended claims.

The invention claimed is:

1. A device for preventing theft of a camera assembly mounted on a tree, said assembly comprising instruments including a camera and a case substantially enclosing said instruments, said case having peripheral sides and a front side having defined therein openings providing external access to viewing instruments;

said device comprising a housing including top and bottom sides, left and right sides and a front side, said front side comprising;

a frame open at a central location allowing viewing by said instruments and the frame overlapping the instruments so as to preclude removal thereof from the front;

said bottom side at a rear location thereof connected to a first vertical and upwardly extending bracket having defined therein an opening including an enlarged lower portion allowing passage of said first bracket over a lag bolt head of a first lag bolt and a narrower passage allowing sliding vertical movement, but not movement away from the tree so that the first bracket may be hooked over the lag bolt head of the first lag bolt and pulled downward into position;

said top side at a rear location thereof connected to a second vertical and upwardly extending bracket having defined therein an opening for receiving a second lag bolt connecting said second bracket to said tree, a hub connected to said second bracket and disposed around a head of said second lag bolt, precluding access to the second lag bolt in a radial direction and a plug lock engageable with said hub, precluding access in an axial direction.

2. The device as defined in claim 1 wherein each of said left and right sides of said housing includes a rearwardly extending triangular portion having a point at a middle position, said triangular portion adapted to be driven into or bent around the said tree.

3. The device as defined in claim 1 wherein said frame of said front side includes narrow portions at left, right and top locations and a wide portion across a bottom location.

4. The device as defined in claim 1 wherein each of said brackets comprises a bent-over extension portion of a horizontally extending top or bottom housing member.

5. The device as defined in claim 1 wherein said hub comprises a tubular member having a first end mounted on said bracket axially with relation to said second lag bolt and a second end disposed to receive said plug lock.

6. The device as defined in claim 1 wherein said hub includes a slot defined therein said plug lock includes a catch engaging said slot.

7. The device as defined in claim 1 wherein said narrower of said opening in said first bracket extends upward from said enlarged lower portion.

* * * * *